Nov. 25, 1952  P. H. GRINLING  2,618,850
SECATEUR EMBODYING A WIRE CUTTER
Filed Sept. 1, 1949
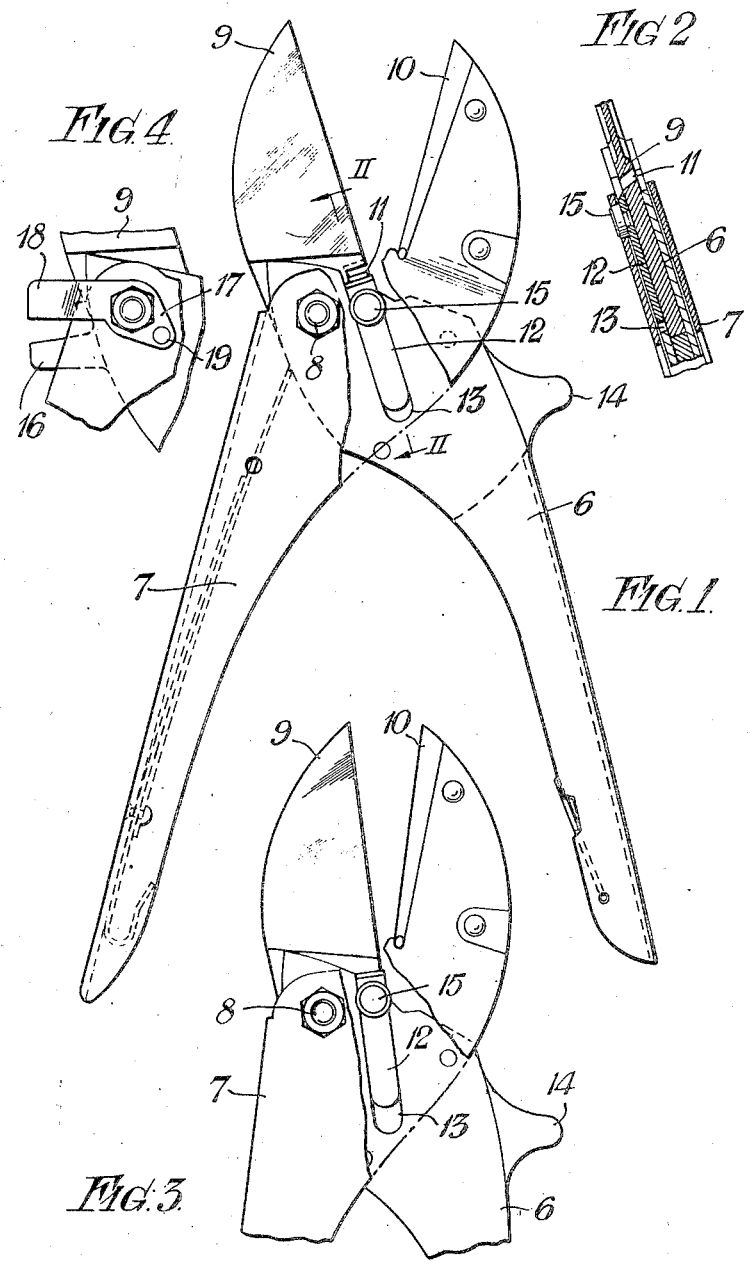
INVENTOR:
PATRICK HENRY GRINLING.
BY K. A. Mays.
ATTORNEY:

Patented Nov. 25, 1952

2,618,850

UNITED STATES PATENT OFFICE 2,618,850

SECATEUR EMBODYING A WIRE CUTTER

Patrick Henry Grinling, Coneyhurst, Ewhurst, England

Application September 1, 1949, Serial No. 113,606
In Great Britain January 13, 1949

2 Claims. (Cl. 30—145)

The present invention relates to improvements in secateurs and like devices and it has for its object to improve the utility of such devices.

More especially the present invention relates to secateurs wherein a cutter blade is adapted to close onto a flat or plain jaw preferably with a drawing action, the required motion being imparted to the cutting blade by the fact that the pivotal connection between the cutter blade and the plain jaw is offset in relation to the line of contact between the blade and jaw; and as applied to such secateurs the object of the present invention is to provide an article of enhanced utility in that it may also be used in a convenient and satisfactory manner for cutting wire.

In accordance with the present invention, and in its broadest aspect, secateurs or like devices embody a pair of auxiliary cooperating cutter elements one of which is comprised by or attached to one of the secateur blades while the other is movable in cutting relation to the former element by the same movement which causes the secateur blades to effect their cut. Preferably the two cutter elements are movable by the hand-grip portions of the secateurs with a substantial mechanical advantage so that wire of various gauges may be cut with little effort. The cutter elements are arranged to have a shearing action and if desired the line of cut at the moment when they come into position to make a cut is non-coincident with the pivot so that the cutting is effected with a combined shearing and drawing action resulting in a particularly efficient and satisfactory cutting action.

The cutter elements may thus move in a pivotal manner being directly connected to the two secateur blades and positioned laterally of the body. Preferably however, the relative movement of the cutter elements is of a rectilinear character; in this case one element is slidably guided in a slot or groove in a carrier for one of the secateur blades while the other element is comprised by the wall of a notch cut in said blade, displacement of the former element being effected by a pin or like projection thereon engaging a suitable recess in a carrier for the other blade. By this construction the cutter elements may be positioned at the "throat" between the secateur blades.

Furthermore this construction is particularly applicable to secateurs wherein the two hand grips are U-shaped in section to fit one within the other and pivoted together by a pivot positioned out of line with the cutting edges of the secateur blades. In such case the slot or groove may be formed by cutting away part of that hand grip fitting within the other grip to provide an elongated slot which is closed towards the outside by the other hand grip and towards the inside by the blade itself, to provide a guide housing for the movable cutter element, the cutting edge of which is thus movable over a notch in the blade to cut wire or other material placed in said notch.

Preferred constructions of secateurs according to the invention are shown by way of example on the accompanying drawings wherein:

Fig. 1 is a general view of the secateurs embodying one form of the invention, part of one hand grip being cut away to show the mounting of the movable cutter element, Fig. 2 is a partial section on II—II Fig. 1, Fig. 3 is a partial view showing the action of the wire cutter elements, and Fig. 4 is a partial view of another form of the invention.

As shown on the drawings the secateurs comprise a pair of mutually pivoted members 6, 7 both of which are extended towards the rear to provide hand-grips and both of said members are of U-shape in section, one being adapted to fit within the other and being traversed by a pivot pin 8. Secured between the sides of the U of the inner member 6, and extending forwardly beyond the front end thereof, is the cutter blade 9, while secured between the sides of the outer member 7 is a flat edged jaw 10 against which the cutter blade 9 abuts, said flat edged jaw being preferably formed of non-ferrous material such as bronze or the like, or of a hard non-metallic material. The pivot connection between the two members preferably includes a removable hard metal bush, said bush being traversed by a holding screwed pin embodying a self-locking nut and the pin itself is preferably prevented from rotating by appropriate means.

Referring to Figs. 1 to 3 the wire cutter means comprise a notch or recess 11 formed in cutter means 6, 9 adjacent to the apex of the V formed by blade 9 and the jaw 10 when the secateur is open and a movable cutter element 12 slidable within a housing 13 formed by slotting the member 6 in a line extending parallel to the cutting edge of blade 9. The housing is closed at the base thereof by that part of the blade 9 which extends into, and is fixed within, the sides of the U of the member 6, which part may be shaped to include an outwardly directed lug or projection 14. The outer face of said housing is covered by outer member 7, thus providing a satisfactory guide housing for the element 12. The forward projecting end of the latter is sharpened to form a cutting edge which moves over the face of the blade 9 to have a shearing action against the facing wall of the notch 11. In order to effect displacement of the element 11 when the hand grips 6 and 7 are operated, a pin 15 is provided on the element 12 projecting into a suitable aperture in the side-piece of the U-structure of the hand-grip 7 and at a point adjacent the pivot pin 8. It will be realised that on operation of the hand-grips to close the blade 9 onto the jaw 10, simultaneously the element 12 is displaced to effect a cut against the cutting edge in the wall of the notch 11.

If desired the element 12 may be of dovetail form in cross section and the forward cutting edge thereof may be either at right angles to the longer side or it may be positioned at an angle thereto so that cutting is effected with a shearing action. Further the cutting angle of the blade 9 may be made more obtuse towards the butt end so that a wire accidentally gripped between it and the jaw 10 will not be liable to cause undue strain of the mechanism.

In the alternative form shown in Fig. 4 the cutter blade 9 embodies towards the rear an outwardly directed lug 16, said lug being preferably appropriately hardened for use as one blade of the wire cutter, the cutting edge being set at a slightly acute angle to the face to give a good cutting action.

Attached to the member 6 carrying the plain jaw 10 and preferably secured thereto by means of the pivot pin 8 is a member 17 having a depending portion 18 adapted to act as a counter-blade; the lower face of the depending portion coming into substantially the same plane as one face of the lug 16 and the adjacent edge being sharpened so that the said edge acts as an efficient wire cutter in conjunction with the lug. Preferably the member 17 embodies a dowel pin 19 which prevents rotation of the said member relatively to the U-shaped member 7.

In this form of the invention the line joining the cutting edges of the lug 16 and of the attached member 18 at the moment when they come into position to cut a length of wire or the like, is substantially offset from the pivot 8 to provide a shearing cut with an additional drawing movement providing a highly efficient cutting action. If desired the lug on the cutting blade 9 is located wholly within the confines of the U-shaped member 7 and the latter is appropriately slotted to provide a guide entry into which a length of wire to be cut is placed before the handle members are operated thereby to effect the cutting movement.

I claim:

1. A secateur comprising two pivotally connected cutting means, each means having a marginal portion engaging the marginal portion of the other means for producing a cutting effect, each of said marginal portions having an outer and an inner end, a recess in one of said means adjacent to the inner end of its marginal portion, one of said means comprising a grip element, and a cutter member connected with said grip element and being slidable over the means having the recess and adapted to slide over the latter shearlike upon closing of said means, said marginal portions forming a guide for directing the material to be cut by said cutter member into said recess.

2. A secateur comprising two cutting means, each means having a handle portion and a cutter element secured thereto, each of the latter having a marginal cutting portion, said portions forming a V when the secateur is open, a pivot connection between said two means offset with respect to the center line of said V, a notch in the cutter element of one of said cutting means adjacent to the apex of the V, and a cutter member connected with the other means and slidably guided in the means having the cutter element with the notch to move substantially in the direction of the marginal cutting portion of the element having the notch and over the latter upon closing of said means, said marginal cutting portions forming a guide for directing the material to be cut by said cutter member into said notch.

PATRICK HENRY GRINLING.

REFERENCES CITED

The following references are of record in the file of this patent:

UNITED STATES PATENTS

| Number | Name | Date |
| --- | --- | --- |
| 89,267 | Adair | Apr. 27, 1869 |
| 104,872 | Murray | June 22, 1870 |
| 646,238 | Schnorr | Mar. 27, 1900 |
| 1,997,242 | Ullman | Apr. 9, 1935 |
| 2,005,487 | Zemanek | June 18, 1935 |

FOREIGN PATENTS

| Number | Country | Date |
| --- | --- | --- |
| 571,429 | Great Britain | Aug. 23, 1945 |